Aug. 9, 1960  R. M. HUSBAND  2,948,374
VARIABLE SPEED DRIVE
Filed June 12, 1958  3 Sheets-Sheet 1

INVENTOR.
Robert M. Husband
BY
ATTORNEY

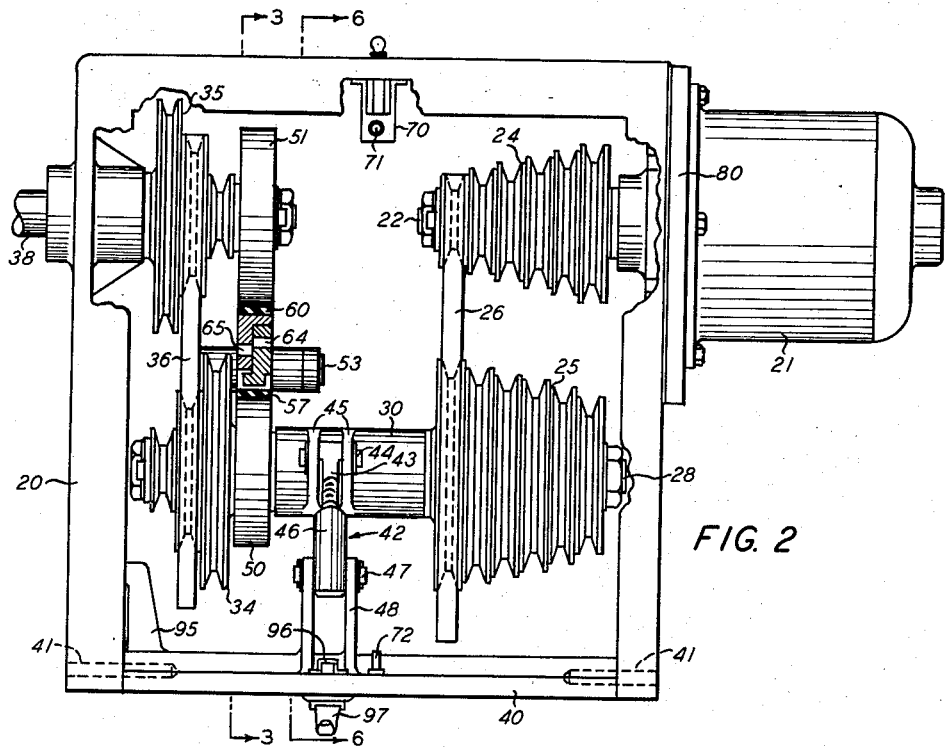
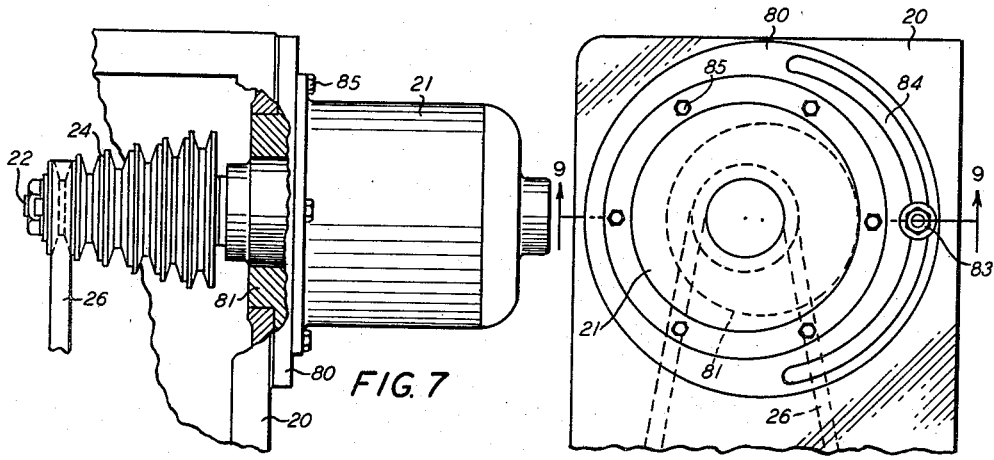

Aug. 9, 1960  R. M. HUSBAND  2,948,374
VARIABLE SPEED DRIVE
Filed June 12, 1958  3 Sheets-Sheet 3

INVENTOR.
Robert M. Husband
BY
ATTORNEY

United States Patent Office 2,948,374
Patented Aug. 9, 1960

2,948,374

VARIABLE SPEED DRIVE

Robert M. Husband, R.R. #3, Fort Wayne, Ind.

Filed June 12, 1958, Ser. No. 741,668

8 Claims. (Cl. 192—135)

The present invention relates to a speed changing unit, and more particularly to a variable speed drive such as may be used in driving a machine at varying rates of speed. In a still more specific aspect, the invention relates to a variable speed belt and pulley drive.

One object of the present invention is to provide a variable speed driving unit in which a change in speed can be effected quickly and easily.

Another object of the invention is to provide a variable speed driving unit that is simple in construction and that can be manufactured at a small fraction of the cost of conventional speed change units in which change in speeds is obtained through gears, clutches, and relatively complex shifter mechanisms.

Another object of the invention is to provide a variable speed driving unit of the belt and pulley type in which means is incorporated for compensating for stretch of the belts after usage.

Still another object of the invention is to provide a variable speed driving unit of the belt and pulley type in which cone pulleys are used, and in which change in speed is effected by shifting at least one belt of the unit along the cone pulleys, and in which means is provided for automatically braking the rotating shafts when the unit is in position to permit shifting this belt.

Other objects of the invention will be apparent hereinafter from the specification and from the recital of the appended claims, particularly when read in conjunction with the accompanying drawings.

One embodiment of the invention is illustrated in the drawings. In this embodiment, power is supplied by an electric motor which drives a cone pulley that in turn drives a second, parallel, cone pulley through a belt. The second cone pulley is mounted on a shaft that is journaled in a swingable arm or plate, which is pivoted at one end to the housing which encloses the unit. This arm is connected at its other end by means of a linkage to the door which forms a closure for the housing. Mounted on the same shaft with the second cone pulley is a third cone pulley which drives a fourth, parallel, cone pulley through a belt. The fourth cone pulley is mounted on the power-output shaft of the unit. When the door is swung open, the linkage lifts the plate which lifts the second and third pulleys out of engagement with the two belts so that the belts are free and can readily be shifted. Moreover, as the plate is lifted, a brake drum on the second shaft is brought into engagement with the brake shoe to stop rotation of this shaft, and a second brake shoe is brought into engagement with a brake drum on the power-output shaft. Thus, the drive is stopped substantially simultaneously with the disengagement of the second and third cone pulleys from their respective belts.

In the drawings:

Fig. 2 is a similar view, but with the door fully open and showing the parts in inoperative position with the belts disengaged from the second and third cone pulleys;

Fig. 7 is a fragmentary view with parts broken away, showing particularly the mounting of the drive motor;

Fig. 8 is an end view looking at the right hand end of Fig. 7 and showing further details of this mounting; and Fig. 9 is a section on the line 9—9 of Fig. 8 looking in the direction of the arrows.

Figure 1:
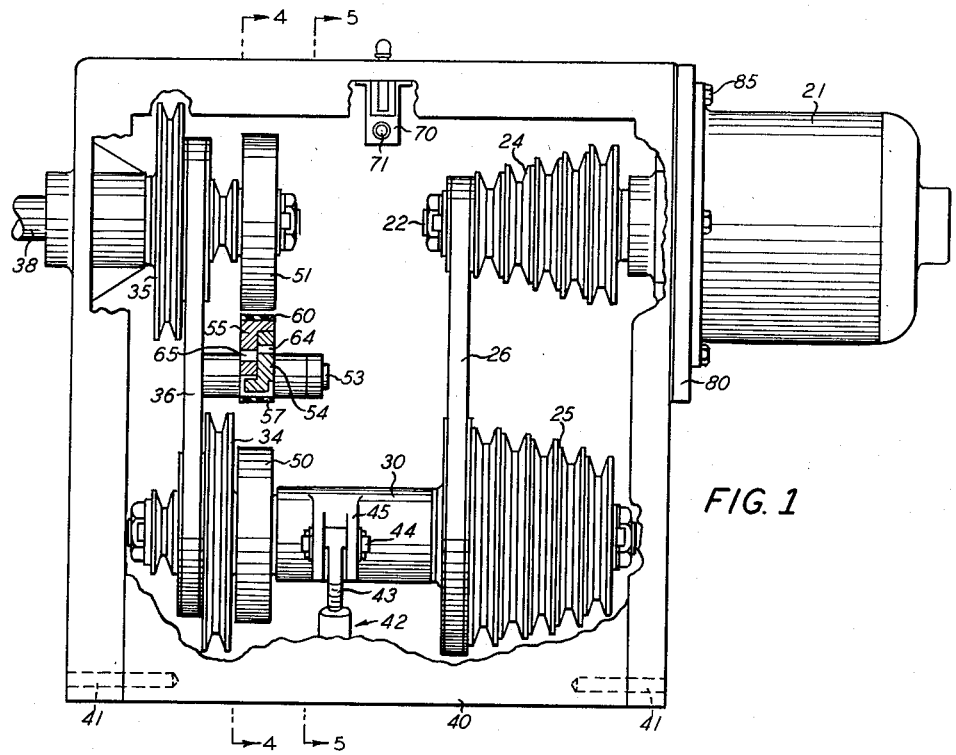
Fig. 1 is a side elevation of one embodiment of a variable speed unit built according to this invention, the door being partially broken away to show the mechanism, the parts being shown in operative driving positions.

Referring now to the drawings by numerals of reference, 20 denotes a box-like housing. Mounted on one side wall of this housing is an input power source such as a flange mounted motor 21. Keyed or otherwise secured to the armature shaft 22 of this motor is a cone pulley 24. This pulley is adapted to drive a mating cone pulley 25 by means of a belt 26.

The cone pulley 25 is keyed or otherwise secured to a shaft 28 (Figs. 5 and 6), which is suitably journaled in a plate 30 that is pivotally mounted at its inner or rear end by means of a shaft 31 on ears 32 that are integral with or fastened to the inside of the rear wall of the housing 20.

The cone pulley 25 is disposed at one side of the arm or plate 30. Disposed at the opposite side of this arm or plate and keyed or otherwise secured to the shaft 28 is a third cone pulley 34. The cone pulley 34 is adapted to drive a fourth cone pulley 35 through a belt 36. The pulley 35 is keyed or otherwise secured to the power-output shaft 38 which extends outwardly through the left hand wall of the housing as viewed in Fig. 1. The power-input shaft 22 and the power-output shaft 38 are parallel to the swing shaft 28.

As shown the cone pulleys 24 and 25 have six V belt sheaves each. As viewed in Fig. 1, from left to right on the cone pulley 24, the sheaves are progressively larger in diameter, and on the cone pulley 25 they are progressively smaller in diameter. As shown, the cone pulleys 34 and 35 have three V belt sheaves each. From left to right on the cone pulley 34, these sheaves are progressively larger in diameter, and on the cone pulley 35 they are progressively smaller in diameter.

The housing 20 is closed at its front by an access door 40 which is hinged on the side walls of the housing by means of hinge pins 41. This door is connected to the hinge plate or arm 30 by a link 42. This link is in the form of a turnbuckle, one member 43 of which is connected by means of a pivot pin 44 with ears 45 that are integral with the hinge plate 30. This member threads adjustably into the other member 46 of the turnbuckle which in turn is connected by a pivot pin 47 with ears 48 that are integral with the door 40.

Keyed or otherwise secured to the shafts 28 and 38, respectively, are brake drums 50 and 51. The brake drum 50 is adjacent to the cone pulley 34; and the brake drum 51 is adjacent to the cone pulley 35.

Pivotally mounted at their inner ends to swing on a common shaft 53 (Figs. 3 and 4) are a pair of brake arms 54 and 55. The shaft 53 is journaled in ears 56 integral with the back wall of the housing 20. Adjustably mounted on the arm 54 for lateral adjustment thereon is a brake shoe 57. This is adjustably secured to the arm 54 by bolts 58 which pass through spaced, aligned, longitudinal, straight slots 59 in the brake shoe and which thread into the arm 54. Mounted on the arm 55 is a brake shoe 60.

The arms 54 and 55 are connected for movement together by means of a bolt 62 which passes through slots 64 and 65 in the arm 54 and 55, respectively. These slots are angularly inclined to one another.

Figures 5, 6:
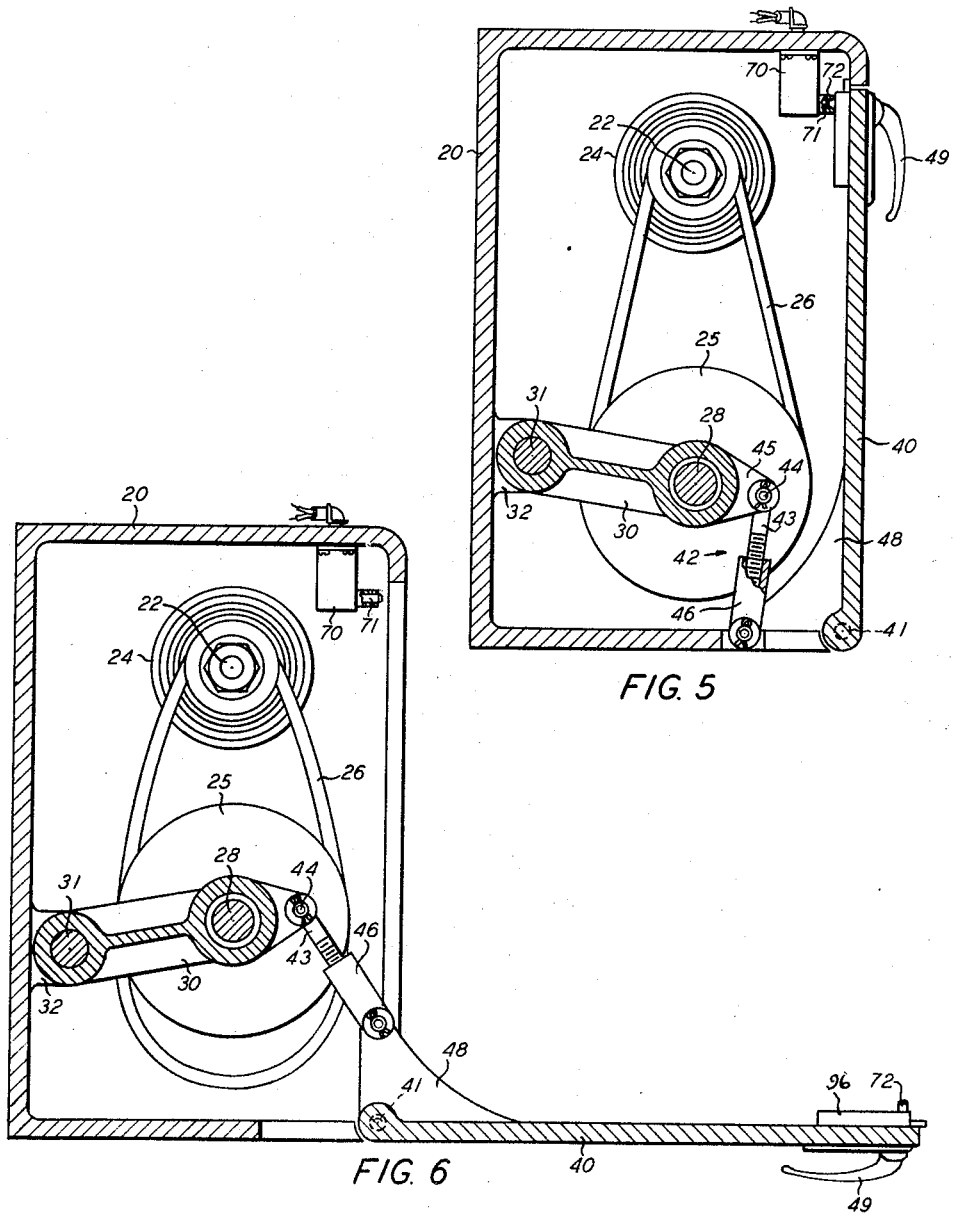
Fig. 5 is a section on the line 5—5 of Fig. 1 looking in the direction of the arrows.
Fig. 6 is a section on the line 6—6 of Fig. 2 looking in the direction of the arrows.

When the access door 40 is swung downward to its open position, the toggle linkage 48—46—43 raises the hinge plate 30, lifting swing shaft 28 and cone pulleys 25 and 34 to the position shown in Fig. 6 where the belts 26 and 36 hang loosely so that they may readily be shifted by hand to any desired position along their respective pairs of cone pulleys to change the speed ratio of the unit.

Attached to the housing 20 is an electrical switch 70 (Fig. 5) which is wired into the circuit to the drive motor 21, and which is adapted to be closed, to start the motor, when the door 40 is closed, by a spring-loaded plunger 71 which is engaged by a stud 72 that is fastened to the door.

As a safeguard against accidental starting, the plunger is surrounded by a sleeve of such length that the stud 72 only engages the plunger after it has entered the sleeve. Thus the spring plunger 71 is not in a position where it can be accidentally bumped by the operator.

When the access door 40 is opened, the stud 72 disengages the plunger 71, opening the switch 70 and stopping the drive motor 21. The motor may be equipped with a magnetic, disc-type brake (not shown) to stop the motor itself, but the belts and pulleys may coast. Therefore the brake shoes 57 and 60 are provided. The opening of the closure door 40, which raises the swing shaft 28 causes the brake drum 50 to engage the brake shoe 57; and as the brake drum 50 continues its upward movement, the brake arms 54 and 55 acting together move upward to cause the brake shoe 60 to engage the brake drum 51, thus stopping the brake drums, their respective shafts 28 and 38, and connected moving parts.

The belts 26 and 36, when new, are matched belts of equal length. However, after some months of use it is quite possible that one belt will stretch more than the other. This is due to the fact that these belts run at different speeds in feet per minute, and since this unit is a constant horsepower transmission, the slower belt operates at more pounds pull than the faster one. This difference in belt tension could result, therefore, in one belt becoming longer than the other.

Adjustment of the turnbuckle 42 will adjust the tension of the belts 26 and 36, but such adjustment will adjust pulleys 25 and 34 equally with reference to pulleys 24 and 35. Obviously this will not correct any difference in length between belts 26 and 36. Hence an additional adjusting means has been provided for compensating for difference in length between betl 26 and belt 36.

This is accomplished by mounting the assembly comprising motor 21, cone pulley 24, and shaft 22 on an eccentric plate 80 which is rotatably adjustable in housing 20. The plate 80 has a machined boss or hub 81 (Fig. 7) fitting into a bore hole in the housing 20. The periphery of this hub or boss is eccentric of the shaft 22 so that the rotary adjustment of plate 80 provides a means for increasing or decreasing the distance between the cone pulleys 24 and 25 independently of the distance of the cone pulleys 34 and 35, thereby compensating for any inequality of length occurring between the belts 26 and 36. This adjustment is effected by loosening the clamp nut 83 on its stud, which passes through an arcuate slot 84 in the eccentric plate 80. Movement of the eccentric plate in one direction raises the shaft 22 and pulley 24 and increases the distance between the pulleys 24 and 25, and movement of the eccentric plate in the opposite direction decreases this distance. When the desired adjustment has been made, the clamp nut 83 is tightened to lock the eccentric plate in adjusted position. The motor 21 is fastened to plate 80 by bolts 85.

The means described for adjusting distance between the cone pulley 24 and the cone pulley 25 is simple, inexpensive and highly practical. Conceivably, however, the motor 21, cone pulley 24, and shaft 22 could be slidably mounted in the housing 20 and adjusted bodily together by means of a screw.

It should be noted that the cone pulley 25 and power output shaft 38 cannot be made adjustable with respect to the housing 20 because the shaft 38 must remain in fixed alignment with the machine mechanism it drives. Therefore, any tension adjustment of the belt 36 should preferably be made by adjustment of the turnbuckle 42 (Fig. 2).

When adjustment is made, however, the brake shoe 57 should also be adjusted relative to the brake shoe 60. This is effected by adjustment of the position of the bolt 62 in the slots 64 and 65. Since these slots are angularly disposed with respect to each other, it will be seen that when the clamping bolt 62 is moved toward shaft 53, the resulting scissorlike action of the brake arms 54 and 55 will spread the brake shoes 57 and 60 apart, and that conversely, when the clamping bolt 62 is moved away from the brake arm shaft 53, the brake shoes 60 and 57 will be brought closer together. The clamping bolt 62 is retightened when the desired adjustment of the brake arms 54 and 55 has been effected.

The longitudinal adjustment of the brake shoe 57 on the brake arm 54 permits of adjusting the brake shoe 57 to bring it into proper contact relationship with the brake drum 50 as the swing shaft 28 is adjusted. The bolts 58 serve to secure the brake shoe 57 in any adjusted position.

Figures 3, 4:
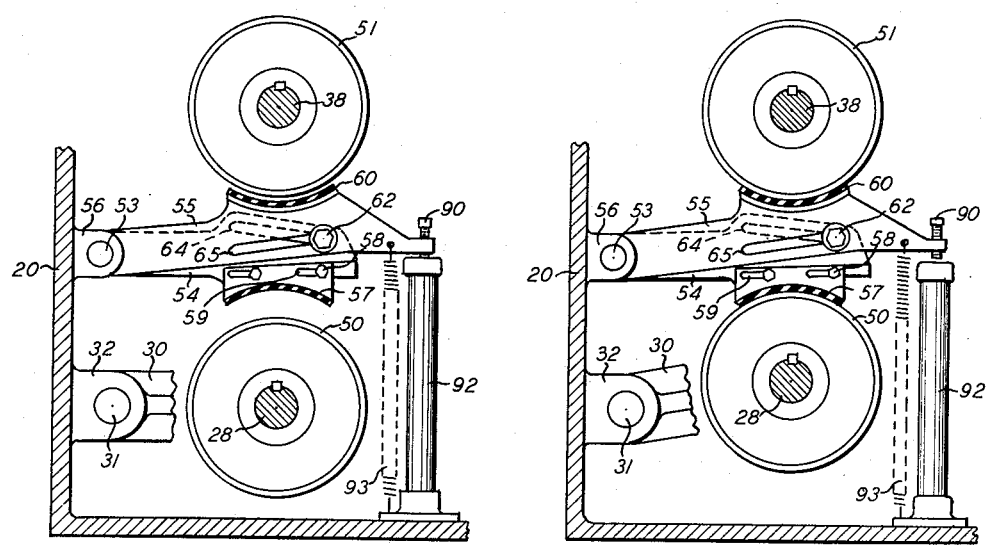
Fig. 3 is a section on the line 3—3 of Fig. 2 looking in the direction of the arrows.
Fig. 4 is a section on the line 4—4 of Fig. 1 looking in the direction of the arrows.

To adjust the brake shoe 60 to proper running clearance with reference to the brake drum 51, an adjusting screw 90 (Figs. 3 and 4) is provided. This screw threads into the outer end of the arm 55. It is adapted to engage the upper end of a post 92 which is secured to the floor of the housing 20. In running position, a tension spring 93 holds the adjusting screw against the upper end of the post, as shown in Fig. 3. The spring 93 is connected at its upper end to the arm 55, and at its lower end to the floor of the housing.

To limit the downward movement of the access door 40 to a horizontal position, an integral lug 95 (Fig. 2) is provided. This lug is positioned to engage the front flange on the housing in open position of the door. The door is held in closed position by a conventional catch 96 which engages behind the upper portion of the front flange of the housing 20. A handle 97 is provided for manipulating the door.

With the device of the present invention, all that is necessary, in order to change speeds, is for the operator to open the door, to move the loosely hanging belts 26 and 36 to their desired new position, and to shut the door. These simple motions can be performed as fast or faster than shifting the gears and clutches in a gear type speed change unit costing many times as much to build.

The speed changing unit of the present invention will operate equally well in either direction and may be quickly and readily reversed by a conventional type of motor reversing switch. As shown, it has eighteen power-output speeds in geometric progression; there are six speeds attainable on the cone pulleys 24, 25 for each of the three belt positions on the cone pulleys 34, 35. These eighteen power-output speeds have an overall speed range of approximately thirty to one in the device illustrated. The device, however, is not restricted to that number of speeds, nor to that range of speeds. Nor is it restricted to the use of V type belts and sheaves as shown. Other types of belts with cone pulley steps suited to their requirements may be used.

Furthermore, although the source of input power as shown is an electric motor, other power sources having a constant speed or a plurality of speeds may be used. Still further, for the motor 21 there may be substituted a conventional gear motor with a gear shift member; and in this case one set of cone pulleys can be omitted, if desired, and a pair of single sheaves substituted therefor.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A variable speed drive comprising a housing, a first cone pulley journaled in said housing, a plate pivotally connected adjacent one end to said housing for swinging movement toward and away from said first cone pulley about an axis parallel to the axis of said first pulley, a second cone pulley journaled on said plate, a belt connecting said pulleys, a door hingedly connected to said housing for swinging movement about an axis parallel to the axis of said plate, and a toggle linkage pivotally connected at one end to said door and pivotally connected at its opposite end to the other end of said plate to swing said plate pivotally toward said first cone pulley to loosen said belt on said pulleys when said door is opened and to swing said plate pivotally away from said first cone pulley to tighten said belt on said pulleys when said door is closed, the axes of both pivotal connections of said toggle linkage being parallel to the axis of swing of said plate.

2. A variable speed drive comprising a housing, a first shaft journaled in said housing, a plate mounted in said housing for movement toward and away from said first shaft, a second shaft journaled in said plate with its axis parallel to the axis of said first shaft, a pair of pulleys, one of which is secured to said first shaft and the other of which is secured to said second shaft, a third shaft journaled in said housing with its axis parallel to the axis of said second shaft, a second pair of pulleys, one of which is secured to said second shaft and the other of which is secured to said third shaft, a pair of belts connecting the two pairs of pulleys, respectively, the two pulleys of one pair at least being cone pulleys, a closure for said housing, said closure being mounted on said housing for movement between open and closed positions, means positively and continuously connecting said closure to said plate throughout the whole of the movement of said closure to move said plate toward said first and third shafts to loosen said belts when said closure is opened, and to move said plate away from said first and third shafts to tighten said belts when said closure is closed, a brake member movably mounted in said housing, and means operatively connecting said plate to said brake member whereby movement of said plate in opposite directions moves said brake member to and from operative relation with respect to said third shaft.

3. A variable speed drive comprising a housing, a first shaft journaled in said housing, a plate pivotally mounted adjacent one end in said housing for swinging movement about an axis parallel to the axis of said first shaft, a second shaft journaled on said plate with its axis parallel to the axis of said first shaft, a third shaft journaled in said housing, a pair of pulleys, one of which is secured to said first shaft and the other of which is secured to said second shaft, and a second pair of pulleys, one of which is secured to said second shaft and the other of which is secured to said third shaft, a pair of belts connecting the two pairs of pulleys, respectively, the two pulleys of one pair at least being cone pulleys, a door hingedly connected to said housing for swinging movement about an axis parallel to the axis of said plate, a toggle linkage positively and continuously connecting said door to the other end of said plate to swing said plate toward said first and third shafts to loosen said belts when said door is opened and to swing said plate away from said first and third shafts to tighten said belt when said door is closed, said toggle linkage including means for adjusting said plate about its pivotal axis to adjust the distance between said second shaft and said first and third shafts in the closed position of said door, and separate means for independently adjusting the distance between said first and said second shafts in the closed position of said door.

4. A variable speed drive comprising a housing, a first shaft journaled in said housing, a plate pivotally mounted adjacent one end in said housing for swinging movement about an axis parallel to the axis of said first shaft, a second shaft journaled on said plate with its axis parallel to the axis of said first shaft, a third shaft journaled in said housing, a pair of pulleys, one of which is secured to said first shaft and the other of which is secured to said second shaft, a second pair of pulleys, one of which is secured to said second shaft, and the other of which is secured to said third shaft, a pair of belts connecting the two pairs of pulleys, respectively, the two pulleys of one pair at least being cone pulleys, a door hingedly connected to said housing for swinging movement about an axis parallel to the axis of said plate, a toggle linkage positively and continuously connecting said door to the other end of said plate to swing said plate toward said first and third shafts to loosen said belts when said door is opened and to swing said plate away from said first and third shafts to tighten said belts when said door is closed, two brake members for braking, respectively, said second and third shafts, and means for moving said brake members to operative positions when said door is opened and for moving said brake members to inoperative positions when said door is closed.

5. A variable speed drive as claimed in claim 3 in which means is provided for braking said third shaft, and said braking means is positioned to brake said third shaft when said door is opened.

6. A variable speed drive comprising a housing, a first shaft journaled in said housing, a plate pivotally mounted adajacent one end in said housing for swinging movement about an axis parallel to the axis of said first shaft, a second shaft journaled on said plate with its axis parallel to the axis of said first shaft, a third shaft journaled in said housing, a pair of pulleys, one of which is secured to said first shaft and the other of which is secured to said second shaft, a second pair of pulleys, one of which is secured to said second shaft and the other of which is secured to said third shaft, a pair of belts connecting the two pairs of pulleys, respectively, the two pulleys of one pair at least being cone pulleys, a door hingedly connected to said housing for swinging movement about an axis parallel to the axis of said plate, a toggle linkage positively and continuously connecting said door to said plate adjacent the other end of said plate to swing said plate about its pivotal axis in one direction to move said second shaft toward said first and third shafts to loosen said belts when said door is opened and to swing said plate in the opposite direction about its pivotal axis to tighten said belts when said door is closed, a first brake drum secured to said third shaft, and a first brake member pivotally mounted in said housing for swinging movement about an axis parallel to the axis of said plate and positioned between said second and third shafts, and means carried by said plate for moving said brake member toward engagement with said drum upon movement of said second shaft toward said first and third shafts.

7. A variable speed drive according to claim 6 having a second brake drum, said second brake drum being secured to said second shaft, a second brake member, said second brake member being pivotally mounted in said housing coaxially with said first brake member, and being connected to said first brake member so that the two brake members move together, said second brake drum being positioned to engage said second brake member and to move said first brake member into engagement with said first brake drum when said door is opened.

8. A variable speed drive as claimed in claim 7 in which said first shaft is driven by a motor whose armature shaft is coaxial therewith, and in which said motor and said first shaft are mounted on a supporting member which is rotatably adjustable about an axis eccentric to the axis of said first shaft to vary the distance between said first and second shafts in the closed position of said door.

References Cited in the file of this patent

UNITED STATES PATENTS

| 2,066,560 | Evans | Jan. 5, 1937 |
| 2,661,777 | Hitchcock | Dec. 8, 1953 |

FOREIGN PATENTS

| 1,027,852 | France | Feb. 18, 1953 |
| 897,351 | Germany | Nov. 19, 1953 |
| 490,168 | Italy | Feb. 6, 1954 |